US007089455B2

(12) United States Patent
Ruhlen et al.

(10) Patent No.: US 7,089,455 B2
(45) Date of Patent: Aug. 8, 2006

(54) METHOD AND SYSTEM FOR HANDLING AN UNEXPECTED EXCEPTION GENERATED BY AN APPLICATION

(75) Inventors: Matthew J. Ruhlen, Redmond, WA (US); Michael R. Marcelais, Redmond, WA (US); Brian T. Hill, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 114 days.

(21) Appl. No.: 10/839,623

(22) Filed: May 5, 2004

(65) Prior Publication Data

US 2004/0221203 A1 Nov. 4, 2004

Related U.S. Application Data

(63) Continuation of application No. 09/570,621, filed on May 15, 2000, now Pat. No. 6,857,085.

(51) Int. Cl.
*G06F 11/00* (2006.01)
(52) U.S. Cl. .......................................... 714/38; 717/124
(58) Field of Classification Search .................. 714/38, 714/124, 48
See application file for complete search history.

(56) References Cited

U.S. PATENT DOCUMENTS 5,526,485 A * 6/1996 Brodsky ........................ 714/38
5,611,043 A * 3/1997 Even et al. ..................... 714/38
5,819,093 A * 10/1998 Davidson et al. ............ 717/126
5,953,530 A * 9/1999 Rishi et al. .................. 717/127
5,974,568 A * 10/1999 McQueen ...................... 714/38
6,158,045 A * 12/2000 You ............................. 717/124
6,240,531 B1 * 5/2001 Spilo et al. .................... 714/38
6,378,087 B1 * 4/2002 Flanagan et al. .............. 714/38
6,427,232 B1 * 7/2002 Ku et al. ...................... 717/124
6,857,085 B1 * 2/2005 Ruhlen et al. ................. 714/38

* cited by examiner

*Primary Examiner*—Scott Baderman
*Assistant Examiner*—Timothy M Bonura
(74) *Attorney, Agent, or Firm*—Merchant & Gould

(57) ABSTRACT

A system and method for handling the generation of an unexpected exception by an application. When the application generates an unexpected exception (i.e., crashes), the application's exception filter launches an outside exception handling program (EHP) that is separate and distinct from the application. Through a special protocol, the application and the EHP collaborate in responding to the unexpected exception. In this protocol, the application and the EHP communicate through kernel objects accessible by handles in a shared memory structure that the application creates before launching of the exception handling program and then shares with the EHP. Through this shared memory, the application also provides the EHP with information about the types of recovery options to offer the user. Through a graphical user interface, the EHP is then responsible for notifying the user of the application that an unexpected exception has occurred. Through the graphical user interface, the EHP also provides the user with the ability to specify various courses of action in response to the unexpected exception.

4 Claims, 5 Drawing Sheets

METHOD AND SYSTEM FOR HANDLING AN UNEXPECTED EXCEPTION GENERATED BY AN APPLICATION

CROSS REFERENCE TO RELATED APPLICATION

This application is a continuation of U.S. patent application Ser. No. 09/570,621, filed on May 15, 2000, now U.S. Pat. No. 6,857,085, which is hereby incorporated by reference in its entirety.

FIELD OF THE INVENTION

The invention relates generally to computer software applications, and more particularly relates to handling an unexpected exception generated by an application.

BACKGROUND OF THE INVENTION

As computers become increasingly powerful, software engineers design ever more complicated computer software applications to take advantage of the available processing power. With the increase in complexity of computer software applications, however, comes an increase in the generation of unexpected exceptions by such applications. When an application generates such an unexpected exception, people say in common parlance that the application has crashed.

When an application crashes (i.e., generates an unexpected exception), the application is shut down by the operating system and the user is denied the continued use of that application session. In other words, the crashing application may prevent the user's computer from further responding to the user in any meaningful way. Another unwanted consequence caused by an application crashing is that the user may lose valuable data that the application was processing prior to the crash.

To help mitigate the consequences to the user of a given application crashing, programmers have in the past added code to the application that is run upon the generation of an otherwise unexpected exception. Typically, this code may attempt to learn enough about the problem to allow the application to proceed in a useful manner. Such code may also attempt data recovery where data has been lost.

Unfortunately, adding code to the application to handle an unexpected exception is not an entirely satisfactory solution to the problems created by a crashing application. For example, the problem that caused the unexpected exception also typically interferes with proper functioning of the application's code for responding to the unexpected exception. Thus, a crashing application may nonetheless cause the user's computer to freeze even though the application contains code for responding to an unexpected exception. When the application malfunctions in this manner, there is no simple way for the user to discover the source of the problem in order to fix the problem. Therefore, there is a need in the art for an improved method for responding to the generation of an unexpected exception by an application.

SUMMARY OF THE INVENTION

The present invention meets the need for an improved method of responding to the generation of an unexpected exception by providing an exception handling program (EHP) that is separate and distinct from the application that crashed (i.e., generated the unexpected exception). Through a special protocol, the application and the EHP collaborate in responding to the unexpected exception. By placing much of the control over the handling of the unexpected exception in the EHP, this arrangement provides greater safety to the user of the crashing application because the EHP is typically a "healthier" program than the application after an unhandled exception. Through a graphical user interface, the EHP may advantageously enable the user of the crashing application to determine how to process the unexpected exception. At the user's discretion, the EHP may also provide the advantage of reporting the unexpected exception over a computer network to the application provider or manufacturer, which may be able to offer an online patch for fixing the problem or other information relevant to the error.

To process the unexpected exception, the application and the EHP communicate through kernel objects accessible by handles in a shared memory structure that the application creates before launching of the exception handling program and then shares with the EHP. Through this shared memory, the application also provides the EHP with information about the types of recovery options to offer the user.

Through a graphical user interface, the EHP is then responsible for notifying the user of the application that an unexpected exception has occurred. Through the graphical user interface, the EHP also provides the user with various courses of action in response to the unexpected exception. Generally, the EHP maps the user's choice into one of three modes of operation: 1) immediately terminating the application; 2) ending the EHP's participation in the exception handling process by indefinitely returning control to the application; or 3) before terminating the application, temporarily returning control to the application so that the application can perform a task (such as data recovery) selected by the user through the EHP's graphical user interface. In the third mode, the EHP can present the user with a progress bar for monitoring completion of the task for which the EHP has returned control to the application.

Through the shared memory structure, the application also provides the EHP with information about the cause of the unexpected exception. If the user consents, the EHP can report this information over a computer network to the application provider, which may be able to offer an online patch for fixing the problem or other information relevant to the error.

Referring again to the protocol through which the application and the EHP communicate, the application and EHP each set flags (in the form of signaling kernel event objects) to indicate when they have completed a task. They also periodically set a flag (by signaling a kernel event object) to indicate that they are still working on a task. In this manner, each program (the application and the EHP) can detect if the other program has malfunctioned by determining if that other program has again signaled the "still working" kernel event object before a predetermined timeout period ends. A "mutex," which is available to only one program at a time upon request to the operating system, is used to ensure that the application and the EHP do not attempt to update or access the kernel objects at the same time.

Generally described, the invention comprises a computer-implementable method for handling an unexpected exception generated by an application. The application detects the unexpected exception. In response to detecting the unexpected exception, the application launches an exception handling program that is separate from the application. Furthermore, the application generates a shared memory structure accessible by the exception handling program. Then, the exception handling program provides a user of the application with a menu of options for processing the unexpected exception. After receiving a selected option chosen by the user from the menu of options, the exception handling program processes the unexpected exception in accordance with the selected option.

In another embodiment of the present invention, an exception handling program receives instructions, from a user of a separate application, concerning how to process an unexpected exception generated by the application. The exception handling program then communicates with the application through a shared memory structure in order to coordinate efforts to process the unexpected exception pursuant to the instructions of the user.

The present invention also comprises a data structure for coordinating communication, which facilitates processing of an unexpected exception, between an exception handling program and a separate application that generated the unexpected exception. The data structure includes a handle to a first kernel event object through which the exception handling program can notify the application that a user has selected an operating mode for processing the unexpected exception.

The data structure also includes a handle to a second kernel event object. Through the second kernel event object, the exception handling program can notify the application that the exception handling program is still performing a first task. Through this second kernel event object, the application can notify the exception handling program that the application is still performing a second task.

The data structure also has a handle to a kernel mutex object. This kernel mutex object is available to only a single program at a time upon request to the operating system. The application and the exception handling program can use this kernel mutex object to coordinate accessing of kernel event objects.

Yet another embodiment of the present invention also comprises a computer-implementable method for handling an unexpected exception generated by an application. The application detects the unexpected exception. In response to detecting the unexpected exception, the application launches an exception handling program that is separate from the application. Furthermore, the application generates a shared memory structure accessible by both the exception handling program and the application so that the exception handling program and the application can collaborate to process the unexpected exception.

The exception handling program may optionally gather information about a cause of the unexpected exception. The exception handling program also optionally reports the information about the cause of the unexpected exception to a repository. The exception handling program also optionally downloads from over a computer network a patch for fixing the cause of the unexpected exception.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
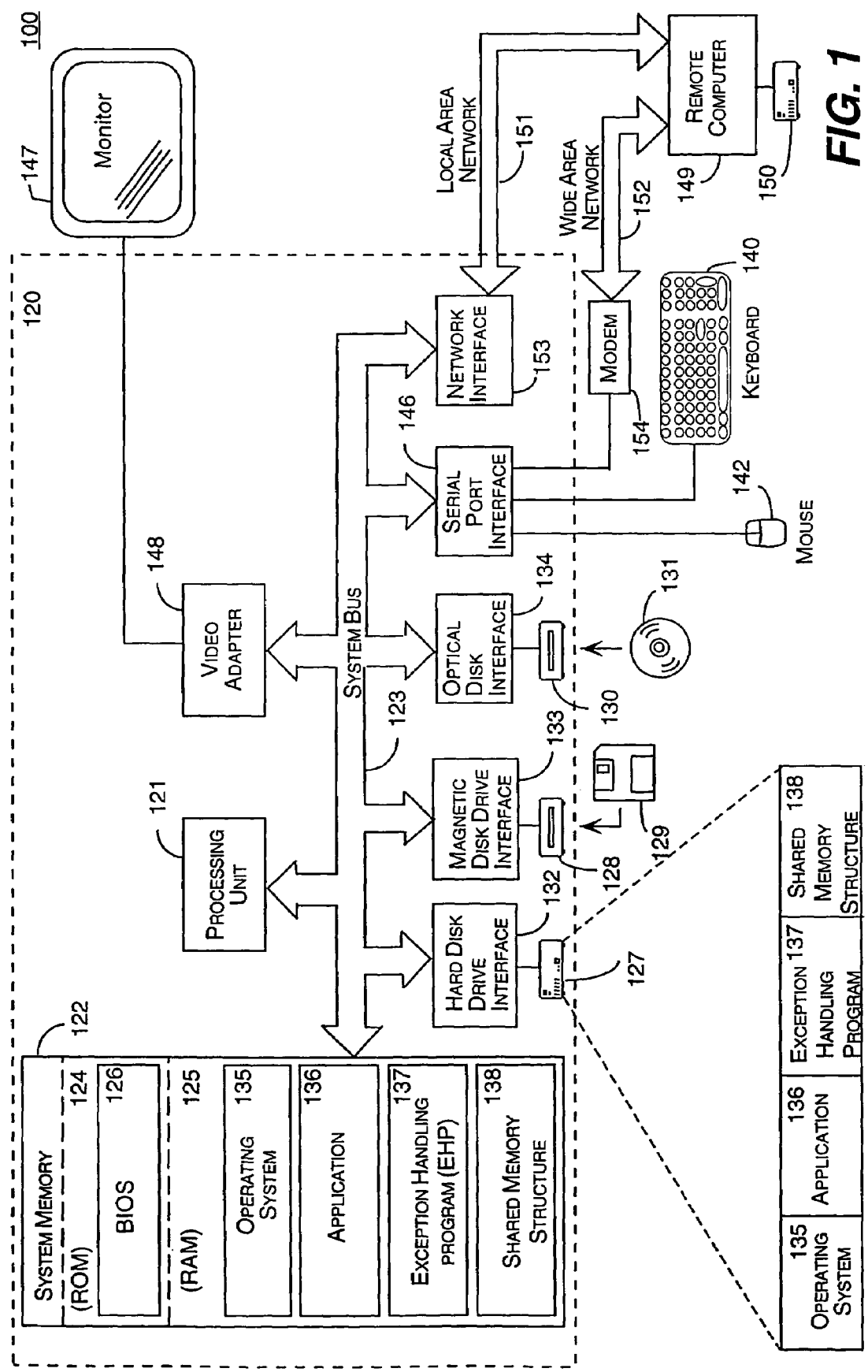
FIG. 1 is a block diagram illustrating the operating environment for an exemplary embodiment of the present invention.

The present invention is typically embodied in a computer-implementable method for handling the generation of an unexpected exception by an application. Colloquially, people say that an application has "crashed" when the application generates such an unexpected exception. When the application generates an unexpected exception (i.e., crashes), the application's exception filter launches an outside exception handling program (EHP) that is separate and distinct from the application. Through a special protocol, the application and the EHP collaborate in responding to the unexpected exception.

In this protocol, the application and the EHP communicate through kernel objects accessible by handles in a shared memory structure that the application creates before launching of the exception handling program and then shares with the EHP. Through the shared memory, the application also provides the EHP with information about the types of recovery options to offer the user.

Through a graphical user interface, the EHP is then responsible for notifying the user of the application that an unexpected exception has occurred. Through the graphical user interface, the EHP also provides the user with various courses of action in response to the unexpected exception. Generally, the EHP maps the user's choice into one of three modes of operation: 1) immediately terminating the application; 2) ending the EHP's participation in the exception handling process by indefinitely returning control to the application; or 3) before terminating the application, temporarily returning control to the application so that the application can perform a task (such as data recovery) selected by the user through the EHP's graphical user interface. In the third mode, the EHP can present the user with a progress bar for monitoring completion of the task for which the EHP has returned control to the application.

Through the shared memory structure, the application also provides the EHP with information about the cause of the unexpected exception. If the user consents, the EHP can report this information over a computer network to the application provider, which may be able to offer an online patch for fixing the problem or other information relevant to the error.

Kernel objects such as kernel event objects and a kernel mutex object are accessible to both the application and the EHP through handles that are stored in the shared memory structure. Handles are references to operating system objects and are well known to those skilled in the art of programming in the WINDOWS environment produced by Microsoft Corporation of Redmond, Wash.

Kernel objects such as kernel event objects and kernel mutex objects are also known to those skilled in the art of programming in the WINDOWS environment. At any given time, a kernel event object may be in one of two states: "signaled" or "non-signaled." "Signaling" a kernel event object refers to changing the kernel event object from the non-signaled state to the signaled state.

Throughout the following detailed description, the text makes repeated reference to the application or the EHP signaling a handle. It should be appreciated that the handle itself is not signaled. Rather, a description of a handle being signaled is a shorthand way of saying that the kernel object referenced by that handle is being signaled.

By signaling various kernel event objects, the application and the EHP can communicate with each other. In a preferred embodiment, the kernel event objects comprise auto-reset kernel event objects. In an auto-reset kernel event object, the kernel event object is automatically and immediately reset to the non-signaled state as soon as the application or the EHP detects that the kernel event object has been signaled by the other program.

By way of further description of the protocol through which the application and the EHP communicate, the application and EHP each set flags (in the form of signaling kernel event objects) to indicate when they have completed a task. They also periodically set a flag (by signaling a kernel event object) to indicate that they are still working on a task.

By requiring that a program (the application or the EHP) periodically signal a "still working" kernel event object in this manner while performing certain functions, each program (the application and the EHP) can detect if the other program has malfunctioned by determining if that other program has again signaled the "still working" kernel event object before a predetermined timeout period (also called a timeout interval) ends. This timeout period can be any amount of time which both the application and the EHP know to be the timeout period. When the application or the EHP is performing a task, it must therefore signal the "still working" kernel event object at least once every timeout interval to keep the other program from assuming that the program expected to signal the "still working" kernel event object has crashed or hung.

A "mutex," which for our usage is available to only one program at a time upon request to the operating system, is used to ensure that the application and the EHP do not attempt to update or access the kernel objects at the same time. The mutex indicates the program to which the mutex is assigned at any given time, and the mutex may be unassigned. If a program makes a request to the operating system that it be assigned the mutex, the operating system examines the mutex to determine if the mutex is currently assigned. If the mutex is available, the operating system updates the mutex to indicate that the mutex is assigned to the requesting program and informs the requesting program accordingly. If the mutex is not available because it is already assigned, the operating system suspends the requesting thread until it becomes available, or, if the specified timeout period elapses, the operating system informs the requesting program that the mutex is unavailable. When a program is done with the mutex, the program is expected to inform the operating system so that the operating system can update the mutex to indicate that the mutex is unassigned. By requiring that a program be assigned the mutex before updating the shared memory structure or any kernel object whose handle is stored in the shared memory structure, the present invention uses the mutex to coordinate the actions of the application and the EHP.

Referring now to the drawings, in which like numerals refer to like elements throughout the several figures, the detailed description elaborates on aspects of the present invention.

Exemplary Operating Environment

FIG. 1 and the following discussion are intended to provide a brief and general description of a suitable computing environment 100 for an implementation of an exemplary embodiment of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. The computer system 120 may include additional input devices (not shown), such as a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network. (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

A number of program modules may be stored in the drives and RAM 125 of the computer system 120. Program modules control how the computer system 120 functions and interacts with the user, with I/O devices or with other computers. Program modules include routines, operating system 135, application program modules (such as application 136), data structures, browsers, and other software or firmware components. The exception handling program 137 is a program module comprising computer-executable instructions for assisting the application 136 in handling an unexpected exception.

No particular programming language will be described for carrying out the various procedures described in the detailed description because it is considered that the operations, steps, and procedures described in the detailed description and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

In an exemplary embodiment of the present invention, application 136 generates an unexpected exception (i.e., crashes) and launches a separate exception handling program (EHP) 137 with which the application collaborates to handle the unexpected exception. To coordinate their efforts, the application 136 and the EHP 137 communicate using the shared memory structure 138.

Figure 2:
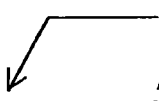
FIG. 2 is a block diagram illustrating a shared memory structure created by a crashing application and through which the crashing application and a separate exception handling program can communicate in accordance with an exemplary embodiment of the present invention.

Data Structure for Facilitating Communication Between the Crashing Application and the EHP FIG. 2 illustrates a shared memory structure 138 that is created by the crashing application 136 and shared with the exception handling program (EHP) 137. This shared memory structure 138 comprises multiple memory blocks 210 through 290. These memory blocks 210–290 comprise information that enables the crashing application 136 and the EHP 137 to communicate with each other in order to handle the unexpected exception generated by the crashing application.

Memory blocks 210–230 comprise handles to kernel event objects through which the crashing application 136 and the EHP 137 communicate. In the following detailed description, the text makes repeated reference to the crashing application 136 or the EHP 137 signaling one of these handles. It should be appreciated that the handle itself is not really signaled. Rather, a reference to a handle being signaled is a shorthand way of saying that the kernel object associated with that handle is being signaled.

Memory block 210 comprises hEventDone, which is a handle to a kernel event object that the EHP 137 signals to notify the crashing application 136 that the user has selected an operating mode. Memory block 220 comprises hEventNotifyDone, which is a handle to a kernel event object that the crashing application 136 signals to notify the EHP 137 of completion of the task for which the EHP has temporarily returned control to the application. Memory block 230 comprises hEventAlive, which is a handle to a kernel event object that both the EHP 137 and the crashing application 136 signal to notify each other that they are still performing a task.

Memory block 240 comprises hMutex, which is a handle to a kernel mutex object. A kernel mutex object is available to only one program at a time upon request to the operating system. Specifically, either the crashing application 136 or the EHP 137 may possess the kernel mutex object referenced by hMutex at any give time, but they cannot both control the mutex referenced by hMutex at the same time. Before updating the shared memory structure 138 or any of the kernel objects whose handles are included in the shared memory structure, a program is supposed to request that it be assigned the mutex referenced by hMutex. Thus, hMutex ensures that the application 136 and the EHP 137 do not attempt to update or access the kernel objects at the same time and thereby helps the application and the EHP 137 to synchronize their efforts to handle the unexpected exception.

Memory blocks 250 and 260 comprise information that the crashing application 136 provides to the EHP 137 to help the EHP understand the nature of the unexpected exception. For example, memory block 250 comprises hApp, which is a kernel process handle to the process of the crashing application 136.

Memory block 260 comprises EXCEPTION_POINTERS, which the EHP 137 also uses to understand the unexpected exception. EXCEPTION_POINTERS are familiar to those skilled in the art of programming in the WINDOWS environment. They provide information about an unexpected exception that has occurred.

Memory blocks 270, 280, and 290 comprise information, supplied by the crashing application 136, which the EHP 137 provides to the user through a graphical user interface of the EHP. Specifically, memory block 270 comprises recovery options that the EHP 137 should offer to the user through the graphical user interface. It is these recovery options that the EHP 137 maps into one of the three modes of operation.

The detailed description now describes the three modes of operation available to the user for handling an unexpected exception in an exemplary embodiment of the present invention. Generally, the EHP 137 has control when querying the user for instructions about which mode to enter in order to handle the unexpected exception. In mode 1, the EHP 137 immediately terminates the application 136. In mode 2, the EHP 137 ends the EHP's participation in the exception handling process by indefinitely returning control to the application 136. In mode 3, the EHP 137 temporarily returns control to the application 136 so that the application can perform a task (such as data recovery) selected by the user through the EHP's graphical user interface; upon again receiving control from the application, the EHP terminates the application.

Memory block 280 comprises a message that the crashing application 136 provides for the EHP 137 to display to the user through the EHP's graphical user interface. This block 280 may include a description of the cause of the unexpected exception. Memory block 290 comprises a progress indication for a progress bar that the EHP 137 supplies to the user through the graphical user interface in order to indicate the progress the application 136 is making in mode 3 after the EHP temporarily returns control to the application in order to complete a specified task, such as date recovery.

Processing an Unexpected Exception Generated by an Application

Figure 3:
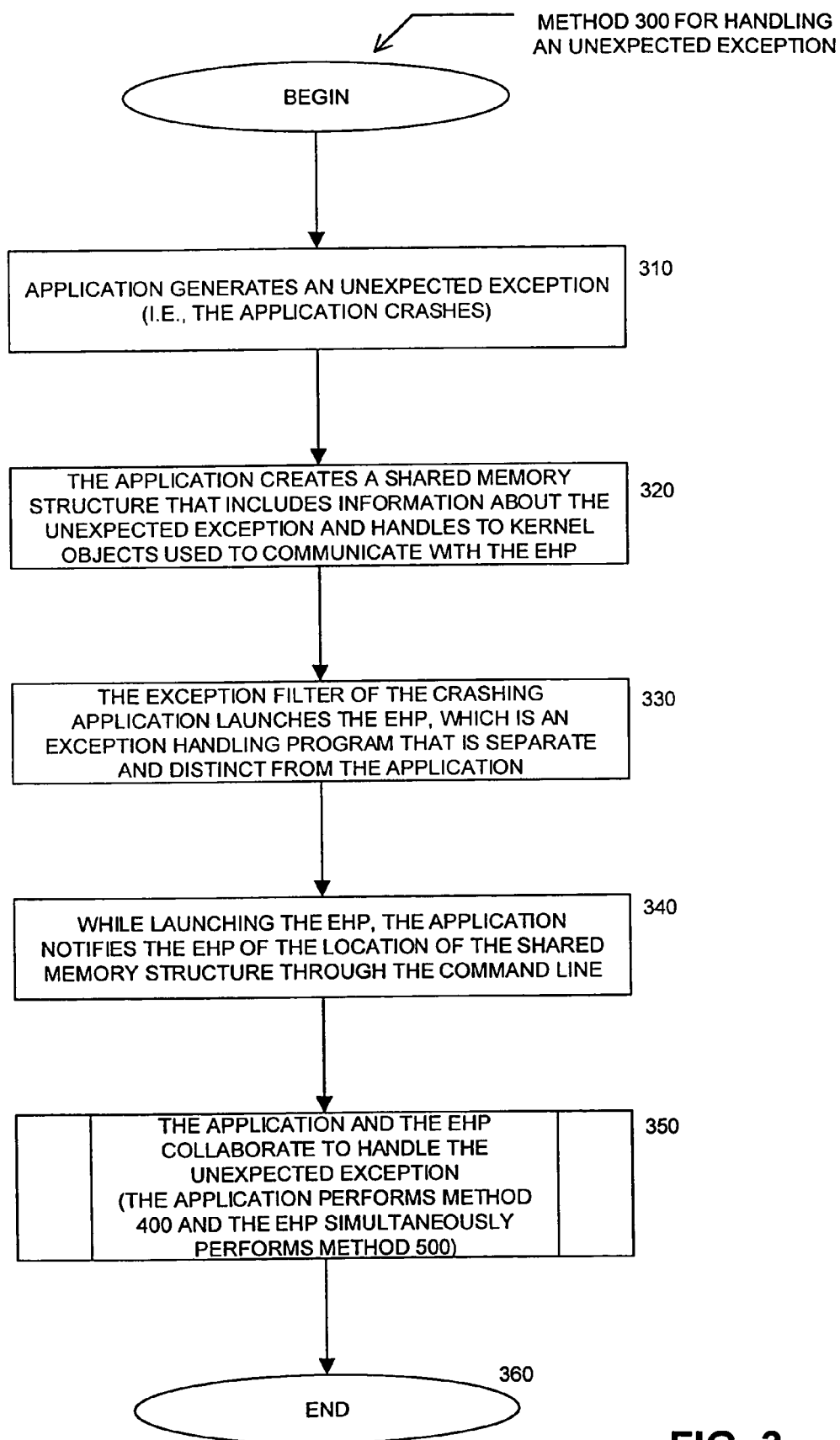
FIG. 3 is a logical flow diagram illustrating a method for handling an unexpected exception in accordance with an exemplary embodiment of the present invention.

FIG. 3 is a logical flow diagram illustrating an exemplary method 300 for handling an unexpected exception. The method begins with step 310.

In step 310, the crashing application 136 generates an unexpected exception. In colloquial terms, the application 136 crashes.

In step 320, the application 136 creates a shared memory structure 138. This shared memory structure 138 includes information about the unexpected exception and handles to kernel objects use to communicate with the EHP 137.

In step 330, the exception filter of the crashing application 136 launches the EHP 137, which is an exception handling program that is separate and distinct from the application. In step 340, while launching the EHP 137, the application 136 provides the EHP with a handle to the shared memory structure 138 through the command line used to execute the EHP.

In step 350, the application 136 and the EHP 137 collaborate to handle the unexpected exception. To do so, the application 136 performs method 400 of FIG. 4 and the EHP 137 simultaneously performs method 500 of FIG. 5. While the application 136 and the EHP 137 are collaborating to handle the unexpected exception, they communicate through the shared memory structure 138 in order to share information and synchronize their efforts. The method 300 then ends in step 360.

Figure 4:
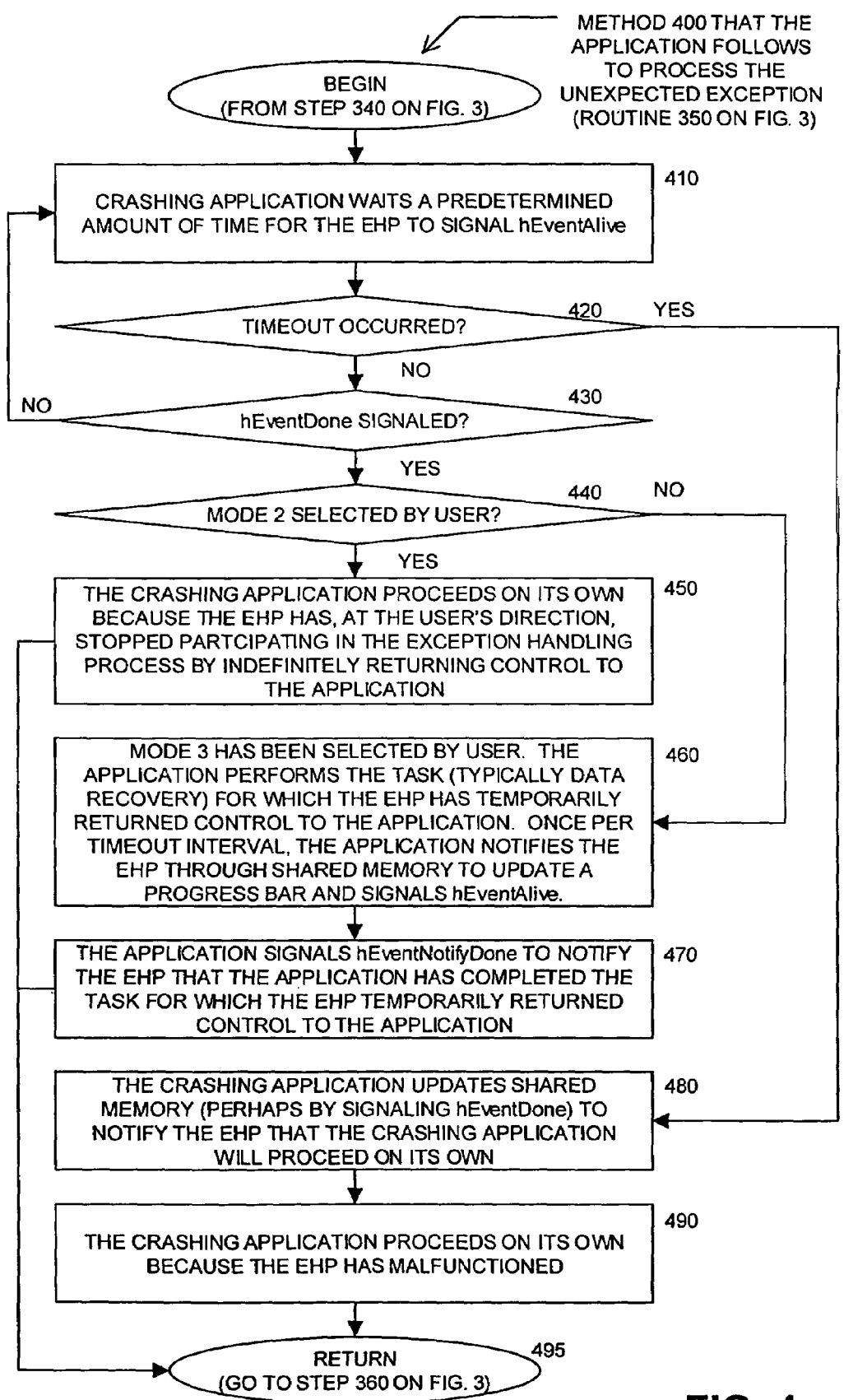
FIG. 4 is a logical flow diagram illustrating a method that the crashing application can follow to process the unexpected exception in accordance with an exemplary embodiment of the present invention.

FIG. 4 is logical flow diagram that illustrates the steps of an exemplary method 400 that the application 136 follows to process the unexpected exception. These steps are followed by the application 136 during routine 350 on FIG. 3. The method 400 begins with step 410.

In step 410, the crashing application 136 waits a predetermined amount of time for the EHP 137 to signal hEventAlive. If the EHP 137 does not signal hEventAlive within the predetermined amount of time, then a timeout occurs.

In step 420, the crashing application 136 determines if a timeout has occurred. If a timeout has not occurred, then the "NO" branch is followed to step 430.

In step 430, the crashing application 136 determines if the EHP 137 has signaled hEventDone. If the EHP 137 has not signaled hEventDone, then the "NO" branch is followed back to step 410, and the crashing application 136 again waits a predetermined amount of time for the EHP to signal hEventAlive.

Figure 5:
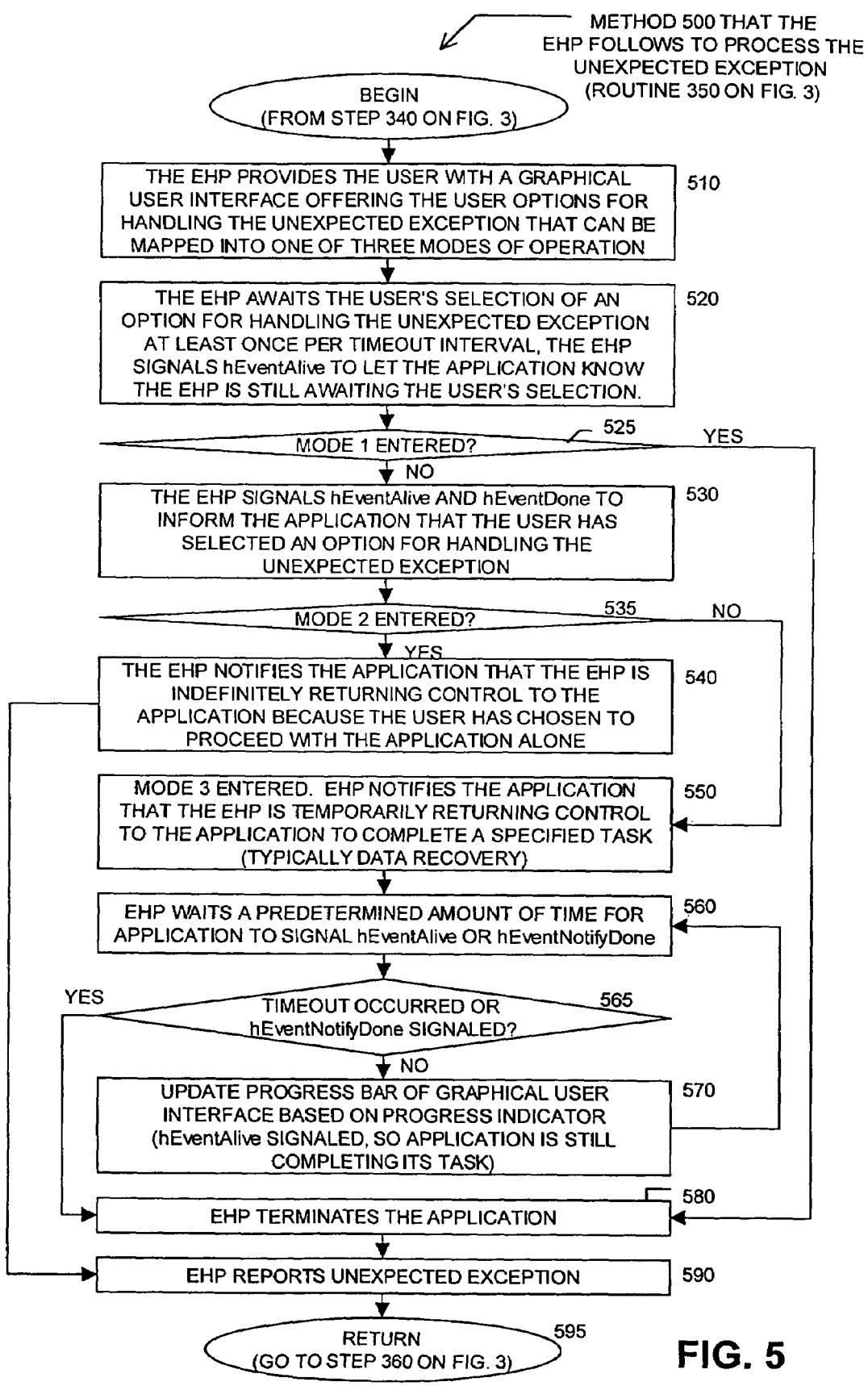
FIG. 5 is a logical flow diagram illustrating a method that the separate exception handling program can follow to process the unexpected exception in accordance with an exemplary embodiment of the present invention.

As long as no timeout occurs and the EHP 137 does not signal hEventDone, the application 136 will continue looping from step 410 to step 420 to step 430 and back to step 410, unless the EHP determines that the user wishes to enter mode 1. Mode 1 is entered when the user indicates to the EHP 137 that the user wants to immediately terminate the crashing application 136. Such a termination of the crashing application 136 is not shown in FIG. 4 because it is not within the control of the application. However, such termination of the crashing application 136 is shown in FIG. 5 when the "YES" branch is followed from step 525 to step 580. If the EHP 137 terminates the application 136, then the method 400 immediately ends.

Referring again to step 420, if the crashing application 136 determines that a timeout has occurred while waiting for the EHP 137 to signal hEventAlive, then the "YES" branch is followed to step 480. In step 480, the crashing application 136 updates the shared memory structure 138 in order to indicate to the EHP 137 that the crashing application is proceeding on its own. The application 136 may perform this notification by signaling hEventDone. In step 490, the crashing application 136 then proceeds on its own because the EHP 137 has malfunctioned. The method 400 then returns in step 495.

Referring again to step 430, if the crashing application 136 determines that the EHP 137 has signaled hEventdone, then the "YES" branch is followed to step 440. When hEventDone is signaled by the EHP 137 in this manner, the EHP is indicating that an operating mode has been selected by the user.

In step 440, the crashing application 136 determines if mode 2 has been selected by the user. Preferably, the crashing application 136 makes this determination by examining a flag (not shown) set by the EHP 137 in the shared memory structure 138. If mode 2 has been selected by the user, then the "YES" branch is followed to step 450. In step 450, the crashing application 136 proceeds on its own because the EHP 137 has, at the user's direction, stopped participating in the exception handling process by indefinitely returning control to the application. The method 400 then returns in step 495.

Referring again to step 440, if the crashing application 136 determines that mode 2 has not been selected by the user, then the "NO" branch is followed to step 460. In this case, mode 3 has been selected by the user.

In step 460, the application 136 then performs the task (typically data recovery) for the which the EHP 137 has temporarily returned control to the application. At least once per timeout interval, the application 136 notifies the EHP 137 through memory block 290 of the shared memory structure 138 to update a progress bar in the EHP's graphical user interface. When updating the memory block 290, the application 136 also signals hEventAlive in order to prevent a timeout. Because the application 136 updates the memory block 290 at least once per timeout interval and signals hEventAlive whenever it updates the memory block 290, the application also therefore signals hEventAlive at least once per timeout interval, thereby preventing a timeout.

In step 470, the application 136 then signals hEventNotifyDone to notify the EHP 137 that the application 136 has completed the task for which the EHP temporarily returned control to the application. The method ends in step 495.

FIG. 5 is logical flow diagram illustrating the steps of an exemplary method 500 that the EHP 137 follows to process the unexpected exception. These steps are followed by the EHP 137 during routine 350 on FIG. 3. The method 500 begins with step 510.

In step 510, the EHP 137 provides the user with the graphical user interface offering the user options for handling the unexpected exception. These options can be supplied to the EHP 137 by the crashing application 136 through memory block 270 of the shared memory structure 138. Through the graphical user interface, the EHP 137 may also transmit to the user the message obtained from the application 136 through memory block 280 of the shared memory structure 138.

The options supplied to the user through the graphical user interface can be mapped into one of three modes of operation. In mode 1, the EHP 137 immediately terminates the application 136. In mode 2, the EHP 137 stops participating in the exception handling process by indefinitely returning control to the application 136. In mode 3, before terminating the application 136, the EHP 137 temporarily returns control to the application so that the application can perform a task, such as data recovery, selected by the user through the EHP's graphical user interface.

In step 520, the EHP 137 awaits the user's selection of an option for handling the unexpected exception. At least once per timeout interval, the EHP 137 signals hEventAlive to let the application 136 know that the EHP is still awaiting the user's selection. Once the EHP 137 receives the user's selection, the EHP translates the user's selection into one of the three aforementioned modes of operation.

In step 525, the EHP 137 determines if mode 1 has been entered. If mode 1 has been entered, then the "YES" branch is followed to step 580. In step 580, the EHP 137 immediately terminates the crashing application 136. In step 590, the EHP 137 may then report the unexpected exception over the Internet 152 to the application provider (i.e., the manufacturer of the application 136 or another entity providing customer support for the application). The routine then returns in step 595.

Referring again to step 525, if the EHP 137 determines that mode 1 has not been entered, then the "NO" branch is followed to step 530. In step 530, the EHP 137 signals hEventAlive and hEventDone to inform the application 136 that the user has selected an option for handling the unexpected exception.

In step 535, the EHP 137 determines if mode 2 has been entered. If the EHP 137 determines that mode 2 has been entered, then the "YES" branch is followed to step 540.

In step 540, the EHP 137 notifies the application 136 that the EHP is indefinitely returning control to the application because the user has chosen to proceed with the application alone. In other words, the EHP 137 notifies the application 136 that mode 2 has been entered. Because the application 136 knows the options offered to the user for handling the unexpected exception and because the application previously instructed the EHP 137 what mode to enter for each of these options, providing the application 136 with the option selected by the user eliminates the need for the EHP 137 to explicitly notify the application that mode 2 has been entered.

In step 590, the EHP 137 then reports the unexpected exception to the application provider. The method 500 returns in step 595.

Referring again to step 535, if the EHP 137 determines that mode 2 has not been entered, then the "NO" branch is followed to step 550. In this case, mode 3 has been entered.

In step 550, the EHP 137 notifies the application 136 that mode 3 has been entered. In other words, the EHP 137 notifies the application 136 that the EHP is temporarily returning control to the application so that the application can complete a specified task, typically data recovery. Because the application 136 knows the options offered to the user for handling the unexpected exception and because the application previously instructed the EHP 137 what mode to enter for each of these options, providing the application 136 with the option selected by the user eliminates the need for the EHP 137 to explicitly notify the application that mode 3 has been entered.

In step 560, the EHP 137 waits a predetermined amount of time for the application 136 to signal hEventAlive or hEventNotifyDone. Essentially, the EHP 137 is waiting for the crashing application 136 to perform the task for which the EHP temporarily returned control to the application.

In step 565, the EHP 137 determines if a timeout has occurred or if hEventNotifyDone has been signaled. A timeout occurs if the predetermined amount of time passes without hEventAlive being signaled, which means that the application 136 has malfunctioned. If hEventNotifyDone has been signaled, then the application 136 has completed the task for which the EHP 137 temporarily returned control to the application. If a timeout occurred or hEventNotifyDone has been signaled by the application 136, then the "YES" branch is followed to step 580.

In step 580, the EHP 137 terminates the application 136. In step 590, the EHP 137 then reports the unexpected exception to the application provider. In step 595, the method 500 then returns.

Referring again to step 565, if a timeout has not occurred and hEventNotifyDone has not been signaled, then the "NO" branch is followed to step 570. In step 570, the EHP 137 updates a progress bar on the graphical user interface. The EHP 137 updates this progress based on the progress indicator provided by the application 136 in memory block 290 of the shared memory structure 138. The application 136 updated this memory block 290 prior to signaling hEventAlive.

Because hEventAlive has been signaled, the application 136 is still completing its task. Accordingly, the method 500 loops back to step 560, where the EHP 137 again waits a predetermined amount of time for the application 136 to signal hEventAlive or hEventNotifyDone.

Conclusion

Therefore, FIGS. 3–5 illustrate how the crashing application 136 and the EHP 137 can cooperate to handle the unexpected exception generated by the application. In one embodiment of the present invention, a program such as the application 136 or the EHP 137 is required to have hMutex before updating the shared memory structure 138 or any of the kernel event objects whose handles are stored in the shared memory structure. This prevents the application 136 and the EHP 137 from attempting to update the shared memory structure 138 at the same time.

If the EHP 137 needs to update the shared memory structure 138 but cannot obtain hMutex within a predetermined amount of time, then a timeout occurs because the application 136 malfunctioned. In this case, the EHP 137 then proceeds with processing of the unexpected exception without help from the application 136. The EHP 137 may even then terminate the application 136. Alternatively, the EHP 137 could let the application 136 continue to run but notify the application through the shared memory structure 138 that the EHP will not be communicating further with the application through the shared memory structure because of the timeout.

In a similar manner, if the application 136 needs to update the shared memory structure 138 but cannot obtain hMutex within a predetermined amount of time, then a timeout occurs because the EHP 137 malfunctioned. In this case, the application 136 then proceeds with processing of the unexpected exception without help from the EHP 137. The application 136 can in this case notify the EHP 137 through the shared memory structure 138 that the application will not be communicating further with the application.

In summary, a first program (the crashing application 136 or the EHP 137) can detect a timeout caused by a second program (the other of the two programs 136 and 137) failing to signal hEventAlive within a predetermined time period or by the second program holding the hMutex for too long. Such a timeout occurs when the second program malfunctions.

When a timeout occurs, the first program (which detected the timeout) can take appropriate action. Typically, this action comprises continuation of the processing of the unexpected exception without the help of the second program (the malfunctioning program). When the first program takes the action of continuing processing of the unexpected exception without help from the malfunctioning program, the first program may signal the malfunctioning program through the shared memory structure 138 that such action has been taken.

Preferably, the second program (the malfunctioning program that caused the timeout) incorporates code that periodically checks the shared memory structure 138 to determine if the first program is continuing processing without help from the second program as a result of a timeout caused by the second program. If the second program discovers that the first program is continuing processing without help from the second program, then the second program knows that it should not expect to communicate further with the first program and may proceed with processing the unexpected exception in its own way.

Those skilled in the art will appreciate that while the detailed description has disclosed particular methods, such as the shared memory structure 138 and the various kernel objects, that enable the EHP 137 and the application 136 to communicate in order to handle an unexpected exception generated by the application, other communication methods are available in both the WINDOWS environment and in other operating system environments that may also permit the EHP and the application to collaborate in the process of handling an unexpected exception. For example, some operating systems could allow the EHP 137 and the application 136 to communicate through methods such as pipes or Remote Procedure Calls (RPCs).

Other alternative embodiments will become apparent to those skilled in the art to which an exemplary embodiment pertains without departing from its spirit and scope. Accordingly, the scope of the present invention is defined by the appended claims rather than the foregoing description.

The invention claimed is:

1. A computer-implementable method for handling an unexpected exception generated by an application comprising:
   receiving at an exception handling program instructions, from a user of a separate application, concerning how to process an unexpected exception generated by the application; and
   communicating with the application through a shared memory structure in order to coordinate efforts to process the unexpected exception pursuant to the instructions of the user, wherein processing the unexpected exception generated by the application comprises downloading an online patch for fixing a cause of the unexpected exception.

2. A computer-readable medium having computer-executable instructions for performing the method of claim 1.

3. A computer system adapted to perform the method of claim 1.

4. The method of claim 1, wherein the shared memory structure indicates recovery options that the exception handling program should offer the user.

* * * * *